United States Patent [19]

Kitagawa

[11] Patent Number: 4,607,338

[45] Date of Patent: Aug. 19, 1986

[54] MISGRIP DETECTION CONTROL SYSTEM FOR USE IN A TRANSFER PRESS

[75] Inventor: Shinichi Kitagawa, Mikawa, Japan

[73] Assignee: Kabushiki Kaisha Komatsu Seisakusho, Tokyo, Japan

[21] Appl. No.: 793,455

[22] Filed: Oct. 28, 1985

Related U.S. Application Data

[63] Continuation of Ser. No. 427,923, Sep. 29, 1982, abandoned.

[30] Foreign Application Priority Data

Nov. 10, 1980 [JP] Japan .................. 55-157817

[51] Int. Cl.[4] ............................................. G06F 15/46
[52] U.S. Cl. .................................. 364/478; 198/340; 198/341; 198/356; 198/464.2; 198/502.3; 198/751
[58] Field of Search ............... 364/468, 469, 478, 474, 364/513; 901/7; 198/751, 340, 341, 502.1, 502.3, 464.2, 356

[56] References Cited

U.S. PATENT DOCUMENTS

| | | | |
|---|---|---|---|
| 3,704,362 | 11/1972 | Kolby et al. ................ | 235/151.13 |
| 4,038,531 | 7/1977 | Loe, Jr. ....................... | 235/151.13 |
| 4,134,486 | 1/1979 | Grove ......................... | 198/502.1 |
| 4,172,347 | 10/1979 | Nitz ............................. | 198/502.3 |
| 4,237,598 | 12/1980 | Williamson ................. | 364/478 |
| 4,239,434 | 12/1980 | Gannon ....................... | 414/136 |
| 4,240,542 | 12/1980 | Wiknich ...................... | 198/751 |
| 4,306,292 | 12/1981 | Head, III ..................... | 364/468 |
| 4,314,342 | 2/1982 | McNeir et al. .............. | 364/468 |
| 4,338,671 | 7/1982 | Korytkowski et al. ..... | 364/478 |
| 4,460,966 | 7/1984 | Chynoweth et al. ........ | 364/468 |

FOREIGN PATENT DOCUMENTS 2082347 3/1982 United Kingdom ........... 364/469

Primary Examiner—Jerry Smith
Assistant Examiner—John R. Lastova
Attorney, Agent, or Firm—Spensley Horn Jubas & Lubitz

[57] ABSTRACT

A misgrip detection control system for detecting unholding or misgrip of a workpiece from a transfer bar in a press.

The system comprises a workpiece memory circuit for storing electrically data indicating whether a workpiece is in position of a corresponding station in the press or not, a workpiece presence/absence checking circuit for detecting the presence or absence of the respective said workpiece by sensors mounted in transfer bars and a misgrip detecting circuit for detecting misgrip of the workpiece by comparison of data from said both circuits.

In one preferred embodiment, all of said circuits are constructed by relays.

18 Claims, 6 Drawing Figures

MISGRIP DETECTION CONTROL SYSTEM FOR USE IN A TRANSFER PRESS

This application is a continuation of U.S. Ser. No. 06/427,923, filed Sept. 29, 1982, now abandoned.

BACKGROUND OF THE INVENTION

1. Field of the Invention

The present invention relates to a system for detecting and controlling a misgrip of a workpiece at the time of feeding workpieces in a transfer press or the like where workpieces are clamped and then transferred into the next machining station by means of transfer bars.

2. Description of the Prior Art

In a prior-art transfer press where works or workpieces are clamped by transfer bars and then transferred to the next machining stations, there are provided workpiece detectors at clamp portions of transfer bars corresponding to each machining station, for detecting the presence or absence of a workpiece at the respective machining station and a workpiece storage circuit for storing workpiece data on the presence or absence of a workpiece at each machining station. If the workpiece data indicate the presence of a workpiece at a machining station but the corresponding workpiece detector does not actually detect the workpiece, then the system will determined that a misgrip takes place.

The prior art system, however, cannot detect such an abnormal condition that the workpiece data indicate the absence of the workpiece but the corresponding workpiece detector is turned on (which means that the workpiece is present), or that a workpiece detector which has been turned on will not be turn off even after the workpiece has been fed into the next machining station and another workpiece was not supplied from the previous machining station.

Further, correction of the workpiece data after the occurence of a misgrip is carried out manually in such a conventional misgrip detecting system and therefore miscorrection of the workpiece data by an operator is likely to occure.

Further, since such a conventional misgrip detecting system does not include means for testing or checking the operation of the system even if a misgrip takes place, the system was sometimes incapable of detecting (or detected errorneously) the misgrip.

SUMMARY OF THE INVENTION

Accordingly, it is an object of the present invention to provide a misgrip detection control system for use in a transfer press capable of detecting a misgrip of a workpiece regardless of the fact when the workpiece data indicate either presence or absence of the workpiece.

Another object of the present invention is to provide a misgrip detection control system for a transfer press having means for checking the operation of the misgrip detecting system.

The above and other objects and advantages of the present invention will become clear from the following description with reference to the accompanying drawings.

DESCRIPTION OF THE PREFERRED EMBODIMENT

Figure 1:
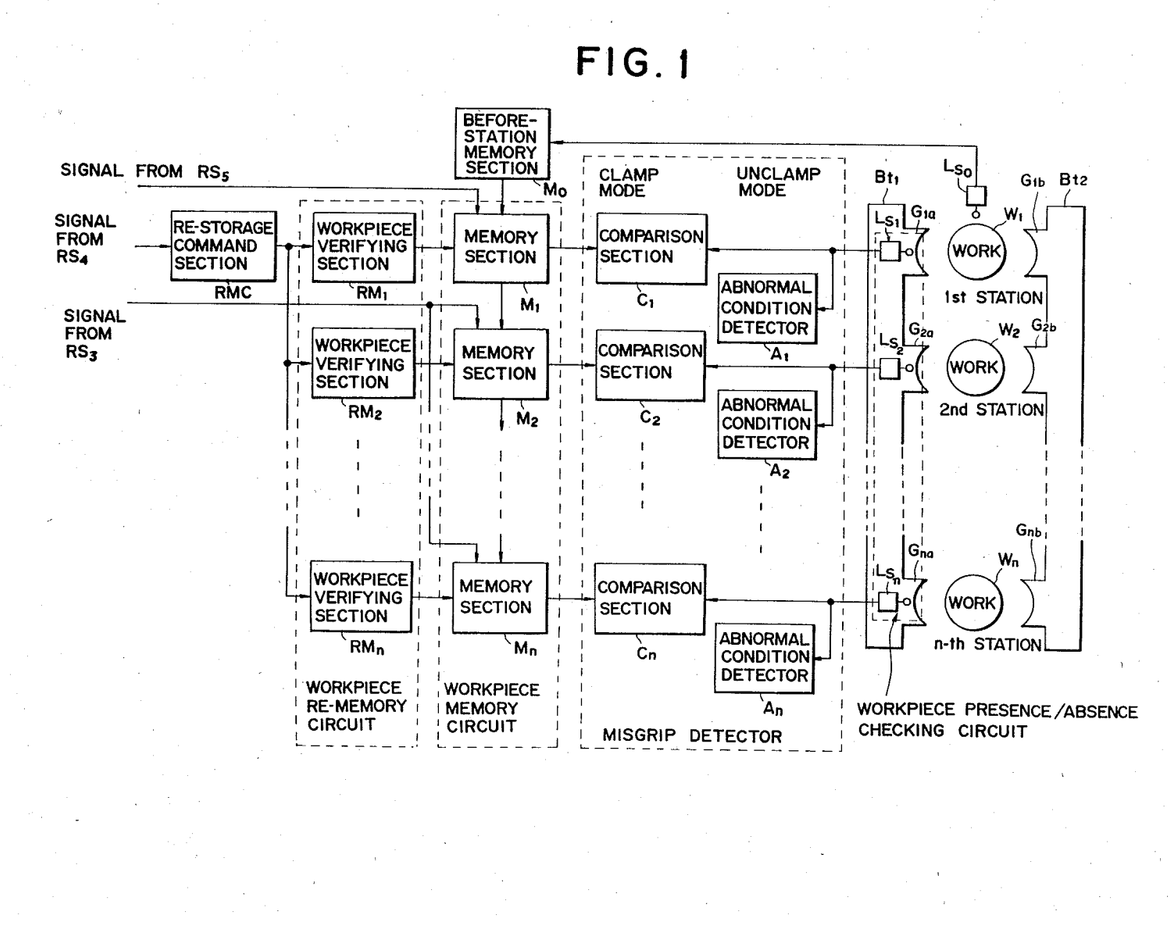
FIG. 1 is a block diagram of an embodiment of a misgrip detection control system for use in a transfer press in accordance with the present invention.

Referring now to FIG. 1, there is shown a block diagram of an embodiment of a system for detecting and controlling the misgripping of workpieces in a transfer press in accordance with the present invention, press (not shown) has a plurality of machining stations (hereinafter simply called station) at which workpieces $W_1$ to $W_n$ are clamped by means of respective pairs of clamp portions $G_{1a}$ and $G_{1b}$, through $G_{na}$ and $G_{nb}$ of transfer bars $B_{t1}$ and $B_{t2}$, and are then transferred to the next stations during each stroke of the press. If misgripping of a workpiece takes place, two or three misgripped workpieces are unfavourably pressed at the station.

At the clamp portions $G_{1a}$ to $G_{na}$ provided in the transfer bar $B_{t1}$ corresponding to each station, limit switches $L_{s1}$ to $L_{sn}$ are provided. The limit switches $L_{s1}$ to $L_{sn}$ are used to detect the presence or absence of the workpiece at the respective stations. Further, a limit switch $L_{so}$ is provided to detect the absence or presence of a workpiece to be fed into the press from the previous step. These limit switches $L_{s1}$, to $L_{sn}$ form a workpiece presence/absence checking circuit A.

Figure 2:
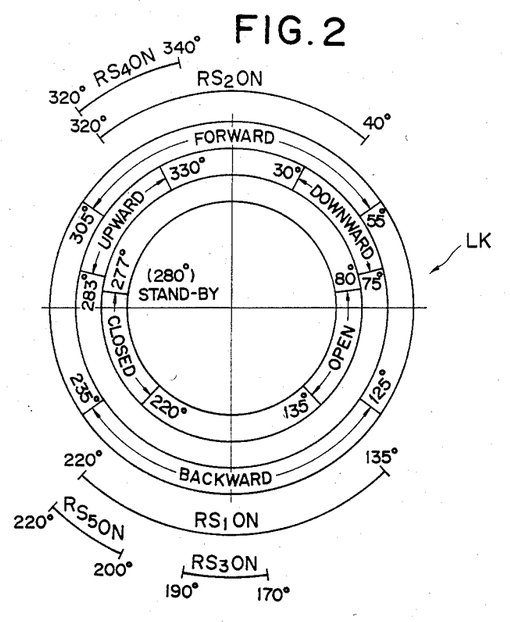
FIG. 2 is a schematic diagram for explanation of the relation between the typical motion of transfer bars and the operational setting of a rotary cam switch in the press.

The transfer bar $B_{t2}$ cooperates with the transfer bar $B_{t1}$ to clamp the workpieces located at the respective stations, move the workpieces upward, forward and then downward so as to transfer the workpieces into the next station. Then, the transfer bar $B_{t1}$ and $B_{t2}$ release the workpieces and return to the original positions. The above procedure is repeated for each stroke of the press. The movement of the transfer bars $B_{t1}$ and $B_{t2}$ is detected by a rotary cam switch provided, for example, in a transfer-bar driving unit (not shown). An example of the function of the rotary cam switch generally referred to as LK is shown in FIG. 2.

As the transfer bars start to move, the rotary cam switch LK will rotate clockwise from a standby point (280 degrees) such that contacts $RS_1$ to $RS_5$ are actuated in sequence. More particularly, the contact $RS_1$ is closed during the unclamp cycle of the transfer bars (corresponding to the range between 135 and 220 degrees), the contact $RS_2$ is closed during the clamp cycle of the transfer bars (corresponding to the range between 320 and 40 degrees), the contact $RS_3$ is closed during the cycle between the 170 and 190 degrees, the contact $RS_4$ is closed during the range between 320 and 340 degrees, and the contact $RS_5$ is closed during the range between 200 and 220 degrees.

A workpiece memory circuit C includes a before-station memory section $M_0$ and 1st to nth station memory sections $M_1$ to $M_n$. The before-station memory section $M_0$ functions to detect the presence or absence of a workpiece to be fed into the transfer press and store the detected workpiece data on the basis of an output from the limit switch $L_{s0}$. When the contact $RS_5$ of the rotary cam switch LK is closed, the workpiece data stored in the before-station memory section $M_0$ will be shifted into the first station memory section $M_1$. The contents in the first station memory section $M_1$ will then be shifted sequentially to the second through n th station memory sections $M_2$ to $M_n$, each time the contact $RS_3$ of the rotary cam switch LK is closed during the cycle of the press operation.

The detection of misgripping can be effected by a misgrip detector D. More specifically, in order to detect the misgrip the misgrip detector D compares the contents of the memory sections $M_1$ to $M_n$ with the respective operation states (on or off) of the limit switches $L_{s1}$ to $L_{sn}$ while the contact $RS_2$ of the rotary cam switch LK is closed (clamp cycle), or detects the respective operation states of the limit switches $L_{s1}$ to $L_{sn}$ while the contact $RS_1$ of the rotary cam switch LK is closed (unclamp cycle).

In the above operation, the misgrip detector D will judge in the clamp cycle that workpiece gripping is carried out in an abnormal condition if content of a memory section shows that a workpiece exists while the workpiece is not actually detected by the corresponding limit switch, and if content of a memory section shows that a workpiece does not exist while the workpiece is actually detected by the corresponding limit switch. On the other hand, the misgrip detector D will judge in the clamp cycle that the workpiece gripping is carried out in a normal condition if content of a memory section shows that a workpiece exists while the workpiece is actually detected by the corresponding limit switch, and if content of a memory section shows that a workpiece does not exist while the workpiece is not actually detected by the corresponding limit switch. Such detection of abnormal or normal conditions can be effected at comparison sections $C_1$ to $C_n$. Table 1 shows workpiece gripping conditions in each case.

TABLE 1

| Content of workpiece storage section | Limit switch state | Workpiece grip condition |
| --- | --- | --- |
| Presence | On | Normal |
| Presence | Off | Abnormal |
| Absence | On | Abnormal |
| Absence | Off | Normal |

If some of the limit switches detect the workpieces during the unclamp cycle, then the corresponding abnormal condition detectors $A_1$ to $A_n$ in the misgrip detecting circuit D will detect abnormal conditions as long as the contact $RS_1$ of the rotary cam switch LK is closed.

If misgripping takes place, then the contents stored in the corresponding memory sections $M_1$ to $M_n$ of the workpiece memory circuit C will not match the actual workpiece placement at the stations. According to the present invention, after stoppage of the press due to any misgripping, pushing of a misgrip resetting switch to resume the press operation will cause the contents of the memory sections $M_1$ to $M_n$ of the workpiece memory circuit C to be automatically re-written to the correct ones. For this purpose, there is provided a workpiece re-memory circuit B which includes a re-storage command section RMC and 1st to nth station workpiece-verifying sections $RM_1$ to $RM_n$. At the restarting of the press operation, the misgrip detecting circuit D will cause the contents of the workpiece-verifying section $RM_1$ to $RM_n$ to be written into the corresponding storage sections $M_1$ to $M_n$ of the workpiece memory circuit C according to the command by the re-storage command section RMC. At this stage, the command section RMC in turn will generate a re-storage command signal when the contact $RS_4$ of the rotary cam switch LK is turned on and the workpiece-verifying sections $RM_1$ to $RM_n$ will verify the workpieces according to the outputs of the limit switches $L_{s1}$ to $L_{sn}$.

Figure 3:
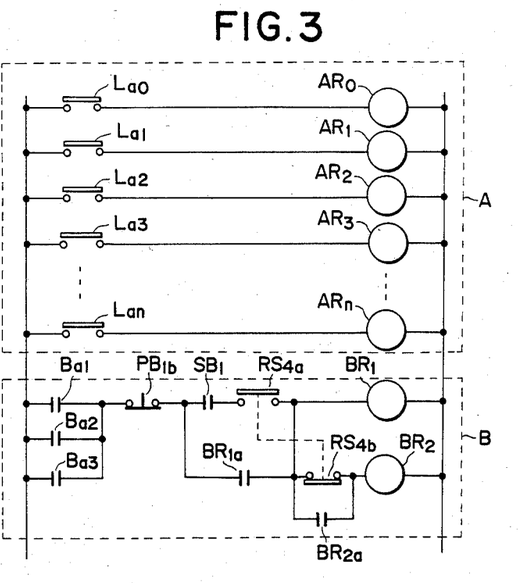
FIG. 3 is a sequence circuit of an embodiment of a workpiece checking circuit and workpiece re-storage circuit used in the misgrip detect/control system of the present invention.
Figure 4:
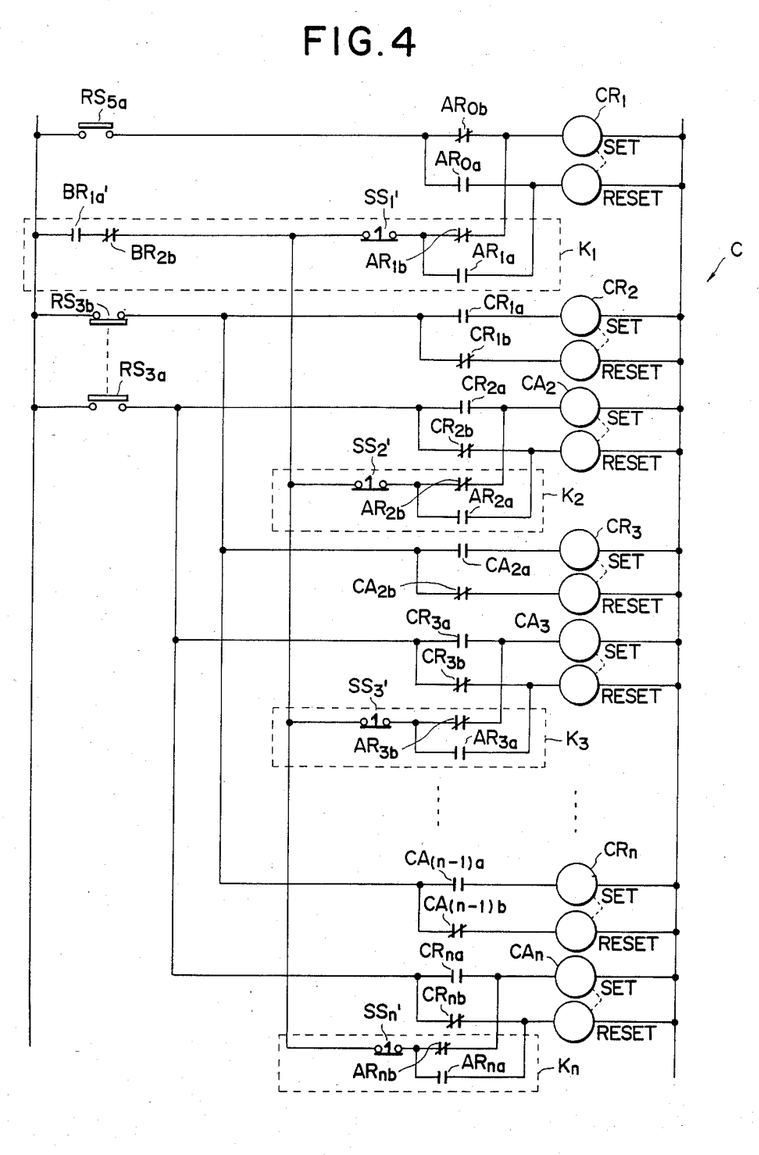
FIG. 4 is a sequence circuit of an embodiment of a workpiece storage circuit used in the system of the invention.
Figure 5:
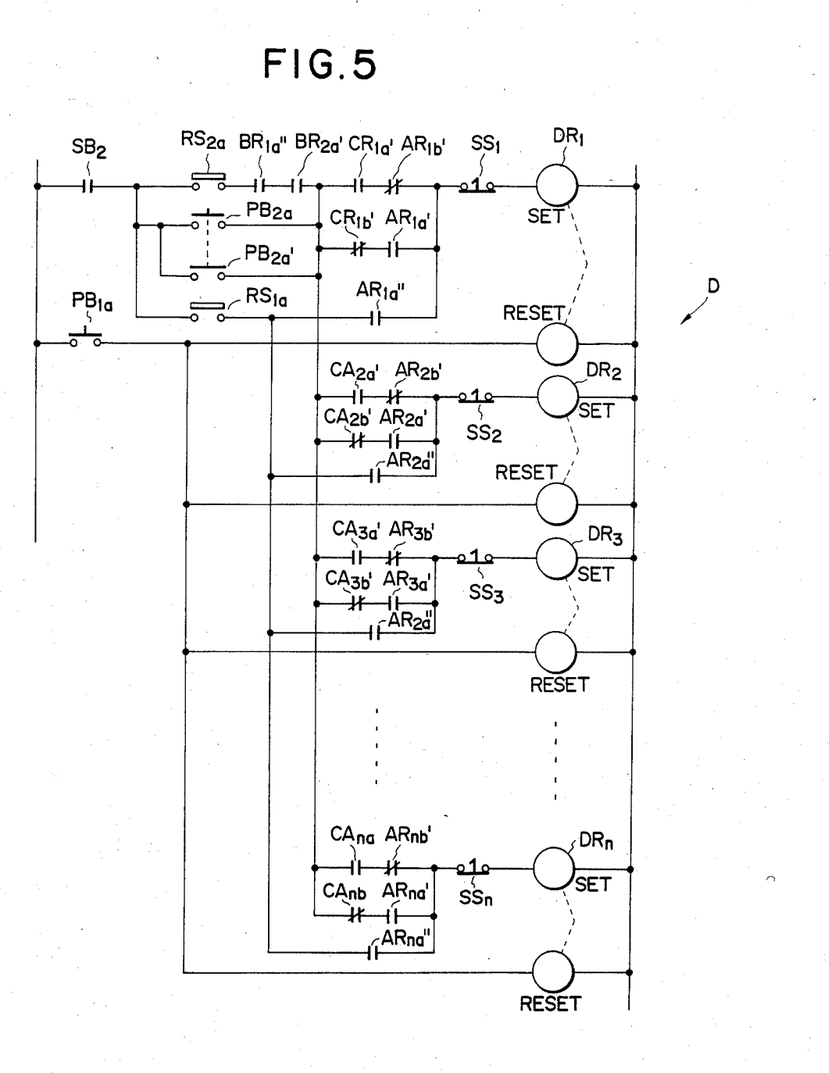
FIG. 5 is a sequence circuit of an embodiment of a misgrip detecting circuit used in the system of the invention.

FIGS. 3 to 5 shows an example of a sequence circuit according to the misgrip detection control system of FIG. 1, wherein FIG. 3 shows the workpiece presence/absence checking circuit A and workpiece re-memory circuit B, FIG. 4 shows the workpiece memory circuit C and FIG. 5 shows the misgrip detecting circuit D.

Referring to FIGS. 3 to 5, contacts $L_{a0}$ to $L_{an}$ are normal-open type contacts of the limit switches $L_{s0}$ to $L_{sn}$ (see FIG. 1) and are closed when the workpieces are clamped by the transfer-bar clamp portions of the transfer bars, whereby corresponding relays $AR_0$ to $AR_n$ will be turned on. Contacts $B_{a1}$ to $B_{a3}$ are used for the operational modes such as continuous feed and inching feed of the press and selection of any one of the modes will cause the corresponding one of the contacts $B_{a1}$ to $B_{a3}$ to be closed. A contact $PB_{1b}$ is a normal-close type contact of the misgrip resetting pushbutton and, contacts $SB_1$ and $SB_2$ are normal-open type contacts which will closed when the truansfer bars start to move.

Figure 6:
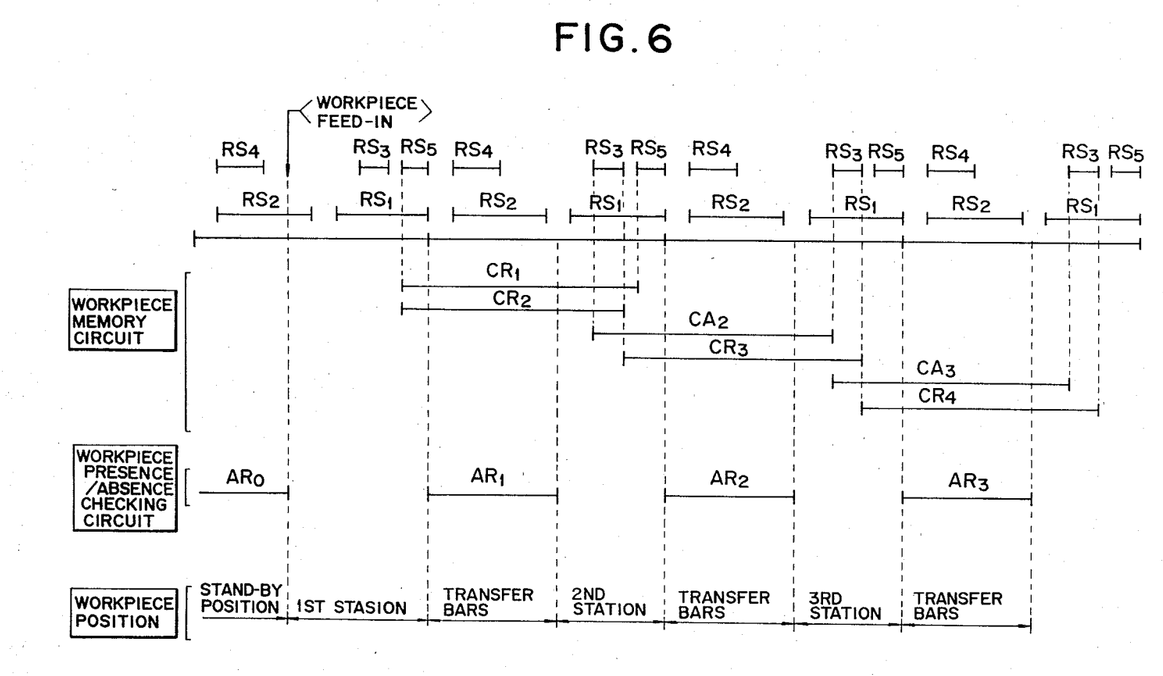
FIG. 6 is a timing chart for explanation of the typical operation of the system of the invention.

The operation of the circuit of FIGS. 3 to 5 will now be explained with reference to a timing chart of FIG. 6 in the case where the transfer bars operate normally without any misgrip.

When one of operational modes for the transfer press is selected, any one of the contacts $B_{a1}$ to $B_{a3}$ will be closed. As soon as the press starts its operation, the contacts $SB_1$ and $SB_2$ will be closed. Rotation of the rotary cam switch LK will cause a contact $RS_{4a}$ (a normal-open contact in the contact $RS_4$ of the rotary cam switch LK) to be closed, which results in that an auxiliary relay $BR_1$ activated and held in such a state that the normal-open contact $BR_{1a}$ of the relay $BR_1$ is kept closed. Then, when a contact $RS_{4b}$ (a normal-close contact in the contact $RS_4$ of the rotary cam switch LK) is closed, an auxiliary relay $BR_2$ is hold since a normal-open contact $BR_{2a}$ of the relay $BR_2$ is kept closed. Hold state of the auxiliary relays $BR_1$ and $BR_2$ will be released when the misgrip-resetting pushbutton (which will be explained later) is actuated, after the occurrence of a misgrip, so as to open the contact $PB_{1b}$.

Since a workpiece is not transferred into a transfer press in the first press cycle of the transfer press, an actual pressing work is not yet performed. The workpiece is placed in the previous process of the transfer press at this time, and the limit switch $L_{s0}$ is closed so as to actuate a relay $AR_0$. When the contact $RS_{5a}$ (a normal-open contact of the contct $RS_5$) of the rotary cam switch LK is closed in the first press cycle of the transfer press, the keep relay $CR_1$ forming the workpiece memory section of the first station is set whereby the workpiece presence state is stored and the normal-open contact $CR_{1a}$ of the keep relay $CR_1$ is simultaneously closed. Since the contact $RS_3$ of the rotary cam switch LK is opened at this time, the contact $RS_{3b}$ (a normal-close contact of the contact $RS_3$) is closed, the keep relay $CR_2$ is accordingly set, and the normal-open contact $CR_{2a}$ will be closed.

The workpiece is next moved to the first station by the transfer bars, and is thus pressed. The contact $RS_3$ of the rotary cam switch LK is closed in the backward movement process so as to close the contact $RS_{3a}$ (a normal-open contact of the contact $RS_3$). In this manner, the keep relay $CA_2$ forming the workpiece memory section of the second station will be set. This will cause the contents in the first station memory section $M_1$ to be shifted into the second station memory section $M_2$. At the same time, a normal-open contact $CA_{2a}$ of the keep-relay $CA_2$ will be closed. When the contact $RS_3$ of the rotary cam switch LK is opened, a contact $RS_{3b}$ will be closed to set a keep relay $CR_3$, thereby storing the contents of the second station memory section $M_2$ into the keep-relay $CR_3$ and also closing a normal-open contact $CR_{3a}$ of the keep relay $CR_3$.

In this way, each time the transfer bars sequentially transfer the workpiece to the next station so as to close the contact $RS_3$ of the rotary cam switch LK, the contents of the first-station memory section will be transferred sequentially into the next station at the timing when the contact $RS_3$ of the rotary cam switch LA turns on, as as been explained in the foregoing.

Misgripping of workpiece can be detected by, in the clamp mode, comparing the contents of the above-mentioned memory sections $M_1$ to $M_n$ with the corresponding contents checked in the workpiece presence/absence checking circuit A of FIG. 3, and by, in the unclamp mode, judging the respective checked contents in the workpiece state checker circuit A. This misgrip detecting operation will be explained in connection with a keep relay $DR_1$ used to detect the misgrip state of the workpiece at the first station.

When the workpiece is fed from the first station to the second station, the workpiece is clamped by the transfer bars. This will cause the limit switch $L_{s1}$ to be turned on, whereby the relay $AR_1$ is actuated to close its normal-open contact $AR_{1a'}$ and open its normal-close contact $AR_{1b}$. Since the keep relay $CR_1$ has been set at this point the normal-open contact $CR_{1a}$ has been closed and the normal-close contact $CR_{1b'}$ has opened, as has been mentioned earlier. Accordingly, the keep relay $DR_1$ will not be set at the time when the contact $RS_2$ of the rotary cam switch LK is closed and the contact $RS_{2a}$ (a normal-open contact of the contact $RS_2$) is closed.

On the other hand, after the work is transferred into the second station and the transfer bars are put into the unclamp mode and if the contact $RS_1$ of the rotary cam switch LK is closed and the contact $RS_{1a}$ (normal-open contact of the contact $RS_1$) is opened, then the limit switch $L_{s1}$ will be turned off and the relay $AR_1$ will be turned off to open its contact $AR_{1a''}$, whereby the keep relay $DR_1$ will not be set.

Explanation will next be directed to the case where an abnormal operation of the transfer bars causes a misgrip.

Assume that when the transfer bars are to feed a workpiece from the first station to the second station and the bars failed to clamp or grip the workpiece located at the first station, that is, a misgrip occurred. Under this condition, the limit switch $L_{s1}$ for the first station will not be turned on in the clamp mode which results in that the relay $AR_1$ is unactuated so as to leave open its normal-open contact $AR_{1a'}$ and leave close its normal-close contact $AR_{1b}$. At this stage, the keep relay $CR_1$ in the first station memory section is set so as to close its normal-open contact $CR_{1a'}$ and open its normal-close contact $CR_{1b'}$. Thus, when the contact $RS_2$ of the rotary cam switch LK is closed and the contact $RS_{2a}$ is closed, a current will flow through the contacts $SB_2$, $SB_{2'}$, $BR_{1a''}$, $BR_{2a'}$, $CA_{1a'}$ and. $AR_{1b'}$, causing the keep relay $DR_1$ to be set. There is provided an alarm device (not shown) which operates to provide a display to indicate thereon that the bars failed to grip the workpiece at the first station and stop the operation of the transfer press, as soon as the keep relay $DR_1$ is set.

When the transfer bars are moved from the first to the second station and subsequently returned to the first station with its unclamped state, the ON state of the limit switch $L_{s1}$ will be detected as a misgrip. That is, in the unclamp state of the transfer bars, the ON state of the limit switch $L_{s1}$ means that the limit switch $L_{s1}$ is abnormal or defective. Even if coincidence is found between the contents of the workpiece memory circuit C and the checked contents of the limit switches in the workpiece presence/absence checker circuit A, it will not be verified that the workpiece has been correctly transferred from the first and the second station (that is, a misgrip has not been occurred). For this reason, the ON state of the limit switch $L_{s1}$ under the above-described condition will be detected as a misgrip. In the unclamp state of the transfer bars (with the contact $RS_{1a}$ being closed), if the limit switch $L_{s1}$ is turned on, the contact $AR_{1a''}$ will be closed and the keep relay $DR_1$ will be set, whereby an abnormal condition will be detected.

Although the above explanation has been made as to the first station, it will be understood that the similar explanation can be applied to other stations.

When a misgrip has been detected in the abovementioned manner, an operator of the press will remove the workpiece from the station where the misgrip has occurred and push the misgrip-resetting pushbutton. This will cause the contact $PB_{1b}$ to be opened so that the relays $BR_1$ and $BR_2$ are unactuated, thereby opening the contacts $BR_{1a''}$ and $BR_{2a'}$. At the same time, the contact $PB_{1a}$ is closed to reset the keep relay $DR_3$, whereby the alarm device is unactuated. After this, the operation of the press can be restarted to resume the operation of the transfer bars. At this stage, since the contact $RS_4$ of the rotary cam switch LK is closed, the relay $BR_1$ will be immediately actuated to thereby close its contacts $BR_{1a}$, $BR_{1a'}$ and $BR_{1a''}$, keeping the relay $BR_1$ actuated. As a result, the contact $BR_{1a'}$ and $BR_{2b}$ are both closed at a portion $K_1$ so that the contents of the keep relays $CR_1$ to $CA_n$ of the memory sections in the station will be restored at portion $K_1$ to $K_n$ according to the workpiece checking contents the workpiece presence/absence checking circuit A.

Then, when the contact $RS_4$ of the rotary cam switch LK is opened, the relay $BR_2$ will be actuated so as to close its contact $BR_{2a}$, thereby keeping the relay $BR_2$ actuated. Simultaneously, the contact $BR_{2b}$ is opened so as to terminate its workpiece re-storage operation and also the contact $BR_{2a'}$ will be closed so as to indicate the detection of a misgrip.

The normal or abnormal operation of the misgrip detecting circuit D can be detected by operating a misgrip test pushbutton. More specifically, in order to start operating the press, the operator will depress the misgrip test pushbutton, which causes the contacts PB$_{2a}$ and PB$_{2a'}$ to be closed. At this point, if an abnormal condition such as short circuiting occurs in the first station contacts CR$_{1a'}$, CR$_{1b'}$, AR$_{1a'}$, AR$_{1b'}$, the second station contacts CA$_{2a'}$, CA$_{2b'}$, AR$_{2a'}$, AR$_{2b'}$..., and the n th-station contacts CR$_{na'}$, CR$_{nb'}$, AR$_{na'}$, AR$_{nb'}$; then one of the keep replays DR$_1$ to DR$_n$ in question is set. In other words, if one of the keep relays CR$_1$ and CA$_2$ to CA$_n$ and relays AR$_1$ to AR$_n$ becomes faulty due to, for example, melted contacts, then the system can detect the faulty relay in the form of the abnormal operation of the misgrip detector circuit D.

Contacts SS$_1$ to SS$_n$ and SS$_{1'}$ to SS$_{n'}$ correspond to normal-close contacts of operation/short-circuit switches (not shown) for each station. In the case that the invention is applied to a transfer press not provided with switches for checking a workpiece at each station, the above-mentioned contacts SS$_1$ to SS$_n$ and SS$_{1'}$ to SS$_{n'}$ should be opened.

With the arrangement as has been disclosed, the present invention achieves the following features. The invention can detect an abnormal workpiece feeding condition regardless of the presence or absence of the workpiece storage contents. The misgrip detect/control system of the invention used in a transfer press might mulfunction in case that the workpiece storage keep-relays CR$_1$, CA$_2$ to CA$_n$ and workpiece checking relays AR$_1$ to AR$_n$ for the stations or become faulty simultaneously, but the possibility of such simultaneous mulfunction is very small. Further, since the invention allows automatic workpiece re-storage after detection of a misgrip, this ensures the workpiece re-storage operation. In addition, the invention can detect such abnormal conditions as broken or short-circuited lines in the misgrip detecting circuit.

While the present invention has been explained with reference to the preferred embodiment shown in the drawings, it should be understood that the invention is not limited to the embodiment but covers all other possible modifications, alternatives and equivalent arrangements included in the scope of the appended claims.

What is claimed is:

1. A misgrip detection control system for use in a transfer press having a transfer bar, comprising:
    a workpiece memory circuit, having a plurality of sequentially arranged memory sections corresponding respectively to a loading position for workpieces and to a plurality of work stations, for storing data, representing the presence or absence of a workpiece, into said memory section corresponding to said loading position and for sequentially shifting said stored data along said sequentially arranged memory sections for every one transfer cycle of said transfer bar;
    a plurality of sensors disposed on portions of said transfer bar corresponding to said work stations;
    a workpiece presence/absence checking circuit for detecting the presence or absence of said workpieces on the basis of outputs from all of said plurality of sensors;
    a misgrip detecting circuit for detecting each station as being abnormal when said stored workpiece presence or absence data of the memory section correpsonding to that station in said workpiece memory circuit is different from the presence or absence of a workpiece detected at the corresponding station by said workpiece presence/absence checking circuit during a clamp operation of said transfer bar;
    said checking circuit and said detecting circuit performing their operations at each clamp operation of said transfer bar; and
    means for interrupting the operation of said transfer press in response to detection of any station as being abnormal, so that said transfer press will only continue to transfer workpieces so long as there is agreement at all stations between the presence or absence of a workpiece thereat and the data at all of the corresponding memory stations.

2. A misgrip detection control system as defined in claim 1, wherein said workpiece memory circuit comprises a plurality of relay circuits each corresponding to one of the respective work stations of the transfer press, said workpiece presence/absence checking circuit comprises a plurality of switches each corresponding to one of the respective work stations, and said misgrip detecting circuit comprises a circuit in which a plurality of contacts of said relay circuits and a plurality of contacts of said corresponding switches are connected in series with respect to each of the respective work stations.

3. A misgrip detection control system as defined in claim 1, wherein said misgrip detecting circuit is a circuit for further detecting a work station as being in an abnormal condition when said workpiece presence/absence checking circuit indicates a workpiece presence with respect to said work station during an unclamp operation of the transfer bar.

4. A misgrip detection control system as defined in claim 3 further comprising a contact for detecting a transfer bar unclampping state, wherein said workpiece presence/absence checking circuit is a circuit having limit switches, and said misgrip detecting circuit further comprises a circuit in which said limit switches and said contact are connected in series with respect to each of the respective work stations.

5. A misgrip detection control system as defined in claim 1 further comprising a testing means for checking the operation of said misgrip detecting circuit at the start of the operation of the transfer press.

6. A misgrip detection control system as defined in claim 5, wherein said testing means enters contents of the workpiece presence/absence circuit into corresponding memory sections of said workpiece memory means.

7. A misgrip detection control system as defined in claim 1, further comprising means for resetting said control system and a workpiece re-memory circuit for automatically rewriting workpiece presence or absence data into said workpiece memory circuit on the bases of said contents of said workpiece presence/absence checking circuit during a re-start of transfer press operation.

8. A misgrip detection control system for use in a transfer press, comprising:
    a transfer bar for transferring a workpiece at a station into a next station every one cycle of said transfer bar, said transfer bar clamping the workpiece while transferring and unclamping the workpiece after the workpiece is transferred to the next station;
    a plurality of sensors disposed on portions of said transfer bar corresponding to said work stations;
    a workpiece memory circuit having a plurality of memory sections corresponding to a plurality of stations, for storing data representing presence or absence of a workpiece into the memory sections corresponding to said plurality of stations and for sequentially shifting said stored data for every one cycle of said transfer bar;

a workpiece presence/absence checking circuit for detecting the presence or absence of respective workpieces on the basis of outputs from all of a plurality of sensors disposed at clamp portions of said transfer bar; and a misgrip detecting circuit for detecting, when any incoincidence takes place between said stored workpiece presence or absence data of the memory sections of said workpiece memory circuit and outputs of said corresponding sensors of said workpiece presence/absence checking circuit during the clamp operation of the transfer bars, a station corresponding to a memory section where said incoincidence takes place as being abnormal, said checking circuit and said detecting circuit performing their operations at each clamp operation of said transfer bar.

9. In a system wherein a plurality of workpieces are sequentially mutually transferred to a sequential set of positions, wherein the presence of said workpieces is sensed at portions of a transfer mechanism corresponding to each of said positions, the improvement comprising:

workpiece memory means having a plurality of memory sections each associated with a respective position, for storing workpiece "should be present" and "should be absent" data, the contents of said memory sections being shifted sequentially from one memory section to another in synchronism with the movement of the workpiece through said system;

data entry means for entering a "should be present" signal into a first memory section of said workpiece memory means in unison with entry of a workpiece into a first position; and comparator means, which performs its operation at each workpiece transfer, for comparing at all of said positions workpiece presence or absence detection signals with corresponding workpiece "should be present" and "should be absent" data at all of the memory sections, and for providing an abnormality signal in the absence of agreement between all of said workpiece detection signals and the data of said corresponding memory sections.

10. System of claim 9 wherein said comparator means further detects an abnormal condition at a position by detecting a workpiece presence signal for that position during a release phase of a workpiece transfer cycle.

11. The system of claim 9 further compriisng means for resetting said system after an abnormal condition detection and for automatically entering workpiece "should be present" data into each memory section based on the presence detection at a corresponding position of a workpiece presence signal during a re-start of said system.

12. The system of claim 9 wherein said memory sections each comprise at least one relay.

13. The system of claim 12 wherein said comparator means comprises a plurality of relays each corresponding to one of said respective positions and each connected in series to a corresponding memory section relay wherein a closed series connection through a comparator means relay and a corresponding memory section relay indicates an abnormal condition at a corresponding position.

14. The system of claim 13 further comprising a switching means for sensing a workpiece transfer cycle release phase, said switching means connected in series with each of said comparator means relays wherein a closed series connection through said switching means and a comparator means relay during a workpiece transfer cycle release phase indicates an abnormal condition at a corresponding position.

15. The system of claim 14 further comprising a testing means for detecting, at the start of operation of said system, a failed condition in any of said memory section relays connected in series with said comparator means relays and a failed condition in any of said comparator means relays connected in series with said switching means.

16. The system of claim 15 wherein said testing means further enters workpiece "should be present" data into each of said memory sections at the start of operation of said system.

17. In a system wherein a plurality of workpieces are sequentially mutually transferred to a sequential set of position, at each of which positions the presence of said workpieces is sensed, the improvement comprising:

workpiece memory means having a plurality of memory sections each associated with a respective position, for storing workpiece "should be present" and "should be absent" data, the contents of said memory sections being shifted sequentially from one memory section to another in synchronism with the movement of the workpieces through said system;

initialization means for entering "should be present" and "should be absent" signals into memory sections corresponding to positions at which workpieces actually are respectively present and absent at the start of operation of said system; and comparator means, which performs its operation at each workpieces transfer, for comparing at all of said positions workpiece present or absence detection signals with corresponding workpiece "should be present" and "should be absent" data at all of the memory sections, and for providing an abnormality signal in the absence of an overall agreement between all of the workpiece detection signals and the data of the corresponding memory sections.

18. The system of claim 17 further comprising data entry means for entering a "should be present" signal into a first memory section of said memory means in unison with entry of a workpiece into a first position.

* * * * *